Figure 1:
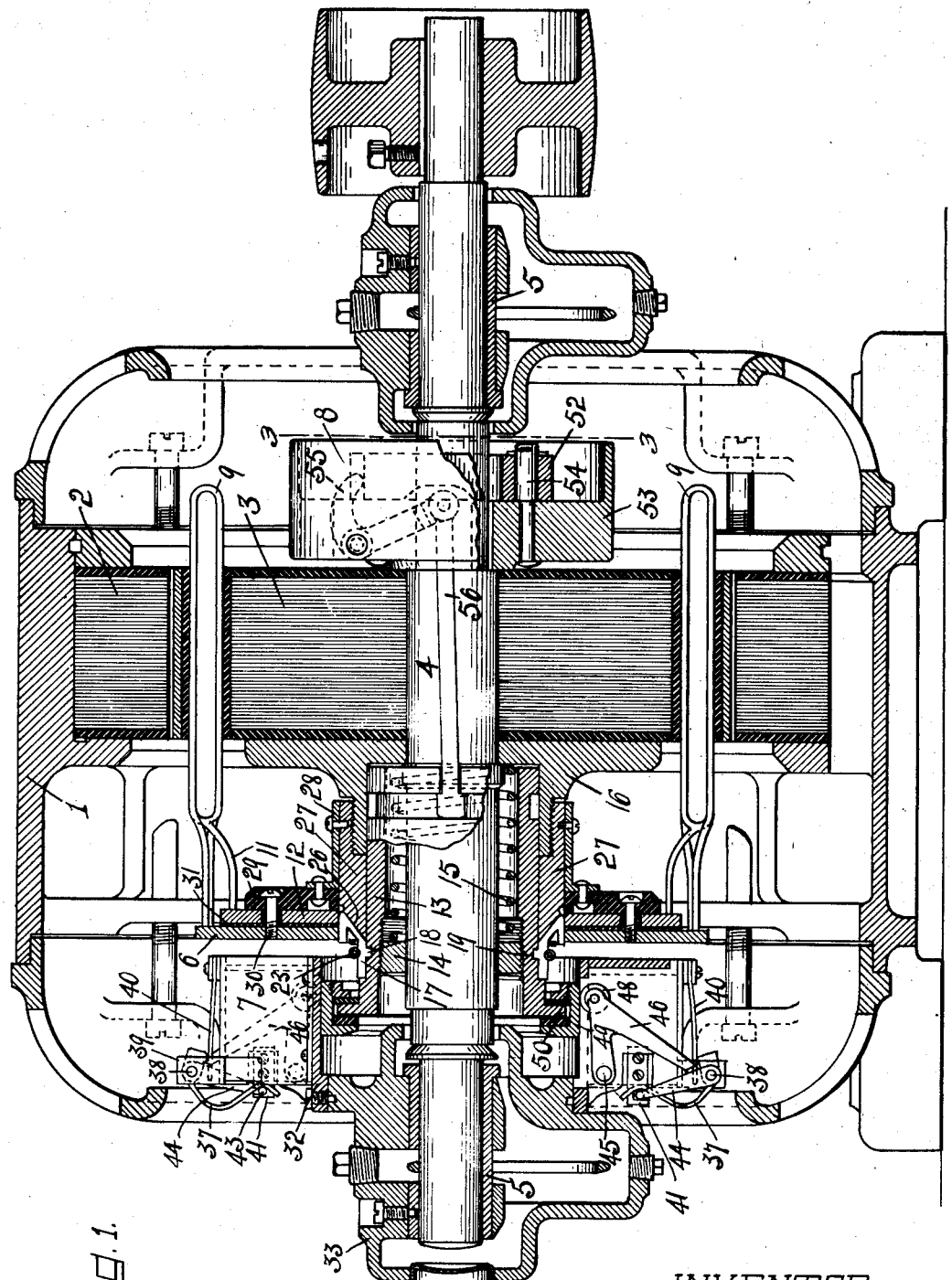

Nov. 13, 1923.

H. W. JEANNIN 1,474,037

ALTERNATING CURRENT MOTOR

Filed March 18, 1919    2 Sheets-Sheet 1

INVENTOR
Harry W. Jeannin,
By Owen, Owen & Crampton,
His attys.

Nov. 13, 1923.
H. W. JEANNIN
ALTERNATING CURRENT MOTOR
Filed March 18, 1919   2 Sheets-Sheet 2
1,474,037
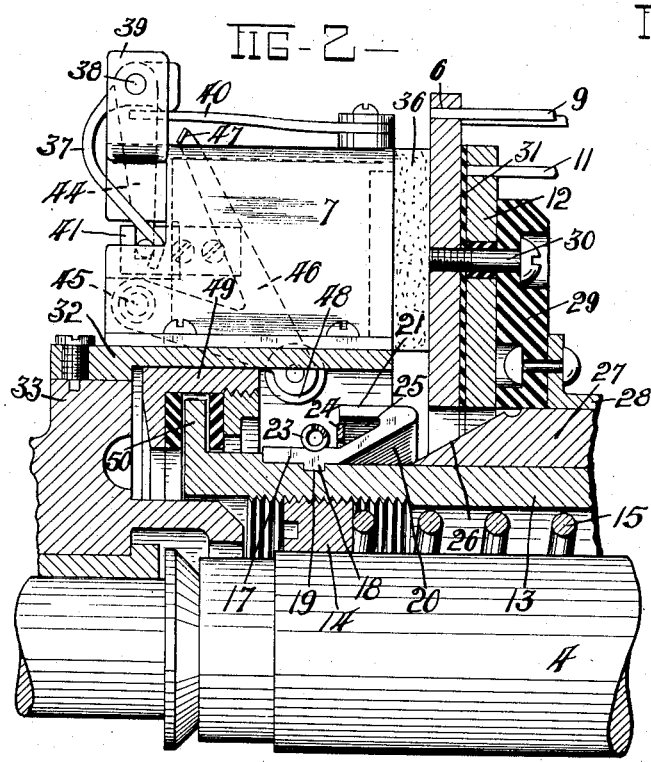
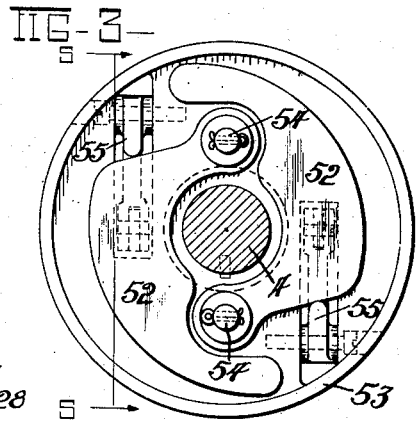
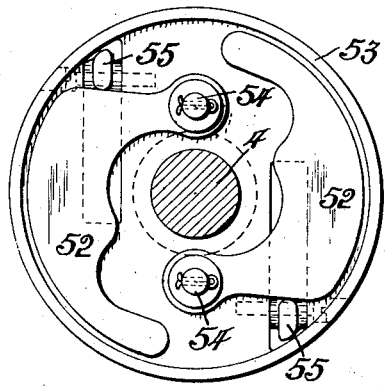
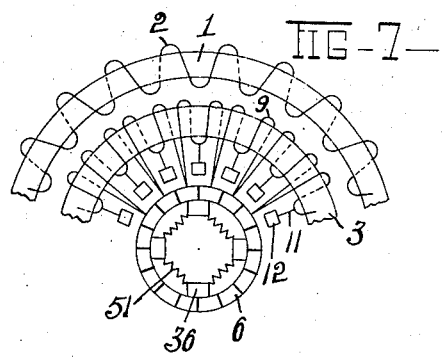
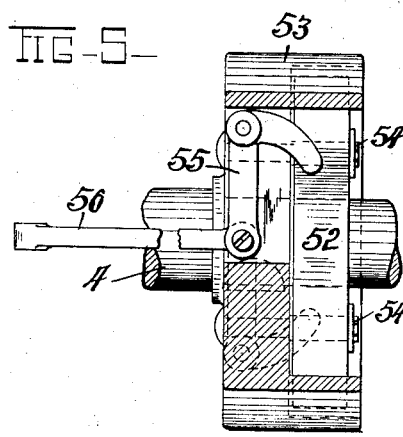
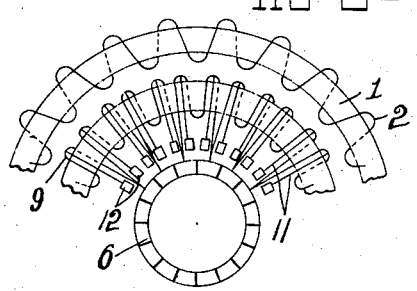
INVENTOR
Harry W. Jeannin,
By Owen Owen & Crampton
Attys.

Patented Nov. 13, 1923.

1,474,037

UNITED STATES PATENT OFFICE.

HARRY W. JEANNIN, OF TOLEDO, OHIO, ASSIGNOR, BY DIRECT AND MESNE ASSIGNMENTS, TO THE JEANNIN ELECTRIC COMPANY, OF TOLEDO, OHIO, A CORPORATION OF OHIO.

ALTERNATING-CURRENT MOTOR.

Application filed March 18, 1919. Serial No. 283,323.

*To all whom it may concern:*

Be it known that I, HARRY W. JEANNIN, a citizen of the United States, and a resident of Toledo, in the county of Lucas and State of Ohio, have invented a certain new and useful Alternating-Current Motor; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to alternating current motors of that type known as repulsion-induction, which can be used both for single and polyphase circuits of alternating current supply, wherein the motor is started on a commuted armature-circuit and when the motor is up to speed the commuted winding is short circuited so that the motor is then operated on the induction instead of the repulsion principle.

The invention has for its general object to improve the construction and operation of electric motors of the character referred to so as to be reliable and efficient in use, comparatively inexpensive of manufacture, and designed to have a much larger output without increasing the size of the machine, and in effect to produce a motor that starts with a high resistance starting winding and when up to speed operates with a low resistance running winding as an induction motor, thus obtaining a high starting torque with low current rush at moment of starting and a very low slip at full load speed with its consequent high efficiency.

A more specific object of the invention is to provide an armature with a progressive commuted winding of the direct current type, in combination with auxiliary taps or leads connecting said winding or the coils thereof at predetermined intervals with separate contacts, and in combination with means for short circuiting the commutator and also the contacts for said taps or leads when the motor has attained speed, whereby the armature winding acts as a high resistance at starting by virtue of the fact that all of the turns of the winding are in series when the motor is starting, and whereby when the motor is up to speed its commutator is short circuited and the several contacts for the auxiliary taps or leads are also short circuited to connect the different turns of each armature coil in parallel with each other and with the connections brought out to the commutator segments, thereby securing a low resistance running condition equivalent to that of the squirrel cage winding of the ordinary induction motor.

Another object of the invention is to provide in a single unit a commutator of duplex form having one set of segments connected to the regular armature winding to effect a commuting of such winding at starting, and having another set of segments forming the contacts to which the auxiliary taps or leads of the winding are connected, and both sets of said segments being adapted to be short-circuited, the regular commutator segments being engaged by the commuting brushes in the ordinary manner during a commuting of the circuit when starting.

Another object of the invention is to provide a simple, novel and effective short-circuiting means which is located at the front or commutator end of the armature and is adapted to engage with the inner circumference of the commutator when normal speed is reached, and which is adapted to make a good electrical short-circuiting contact of very low resistance by the action of a governor device assisted by a sliding of the short-circuited segments upon an incline, which throws the short-circuiting segments radially outward firmly against the commutator segments.

Another object of the invention is to provide a simple, novel and effective speed responsive device which is mounted on the armature and operatively connected with the short circuiting ring and with the brush throw out means, whereby at a certain speed the ring is moved to short-circuiting position and the brushes are thrown out to open circuit position.

With such objects in view, and others which will appear as the description proceeds, the invention comprises various novel features of construction and arrangement of parts which will be set forth with particularity in the following description, and a preferred embodiment of which is illustrated in the accompanying drawings, in which, Figure 1 is a central vertical section of the motor embodying the invention. Fig. 2 is an enlarged fragmentary sectional view showing the commutator, short circuiting ring and brush throw-out device with the parts in starting position. Figs. 3 and 4 are enlarged transverse sections on the line 3—3 in Fig. 1, showing the speed responsive device with the weights in normal position in the former and thrown outwardly from such position in the latter. Fig. 5 is an enlarged section on the line 5—5 in Fig. 3. Fig. 6 is an enlarged perspective view of one of the short circuiting segments; Fig. 7 is a diagrammatical view of the motor and its windings, and Fig. 8 is a similar fragmentary view thereof showing each armature winding coil as provided with two auxiliary leads or taps in connection with contacts separate from the commutator segments.

Referring to the drawings, 1 designates the frame of the motor, 2 the stator or field element thereof, 3 the rotor or armature element mounted on a shaft 4, that is journaled in bearings 5 at each end, 6 the commutator, 7 the brush holders, and 8 the speed responsive device, which is mounted on the shaft 4, to turn therewith.

The frame and stator may be of any approved construction. The rotor or armature 3 is provided with a high resistance winding 9, the coils of which are set in slots in the armature periphery in a well known or any suitable manner, and this winding is employed for starting the motor on the repulsion principle by means of the commutator and brushes, the ends of the coils being connected to proper commutator bars for such purposes, as well understood in the art, which bars in the present instance, are radially disposed.

The primary purpose of my present invention is to provide an alternating current motor having a high resistance armature winding, which adapts the motor to start on the repulsion principle with an extremely high torque and which when the motor is up to speed, is adapted to automatically convert the high resistance winding into a low resistance winding by changing it from a number of turns in series to a paralleling of the turns, whereby the motor is enabled to run on the induction principle. This I accomplish by providing each coil of the armature winding 9 with one or more auxiliary leads or taps 11 having connection with individual or respective contact pieces 12. These contact pieces are insulated from each other, and, in the present instance, are carried by the commutator 6 at the back of its segments and arranged in circular series around the commutator axis with their inner ends exposed, as are also the inner ends of the commutator segments. In the diagrammatical view illustrated in Fig. 7, each armature coil is shown as having one lead or tap extending therefrom to a respective contact 12, while in Fig. 8, each coil is illustrated as having a plurality of leads or taps extending from spaced parts thereof to separate contacts. It will be understood that the greater the number of leads or taps from each coil the greater will be the reduction in the resistance of the winding when the commutator bars are short-circuited.

When the motor is up to normal speed a short-circuiting device is automatically operated to short-circuit both the commutator segment and the contact pieces 12, whereby the coils of the armature winding are changed from series to parallel connected and their resistance reduced accordingly so that the winding is then the exact equivalent of the low resistance squirrel cage winding of the ordinary induction motor.

In the illustrated form of my short circuiting device, 13 designates a sleeve or barrel that is mounted for reciprocatory movements over the shaft 4 at the commutator end of the armature and partly within the commutator and is spaced from the shaft by a bushing 14, which is threaded for longitudinal adjustment within the sleeve. This bushing receives the outer end thrust of a coiled expansion spring 15, which is mounted in the space between the shaft 4 and barrel and has its inner end thrust against the adjacent end member 16 of the armature. This spring normally holds the sleeve 13 in the inoperative position shown in Fig. 2, and the sleeve is moved to its operative short circuiting position as shown in Fig. 1, by the action of the speed responsive device 8, which is operatively connected therewith in the manner hereinafter described.

The sleeve 13 carries on its outer side a short circuiting ring 17, which is made up of a plurality of segments or sections 17ª, (Fig. 6), each of which is provided at its inner edge with a stud 18, adapted to loosely fit into an annular groove 19 provided in the sleeve periphery, whereby the ring sections are caused to have movements with the sleeve. Each ring section 17ª has its inner end or nose portion tapered at its inner side, as shown at 20, and has its outer side straight and disposed in a plane substantially parallel to the sleeve axis, as shown at 21. The outer ends or tail portions of the ring section 17ª are radially narrowed and provided in their outer sides with recesses 22, which transversely register one with another and form an annular seat for a coiled contractile spring 23, which encircles the ring sections and yieldingly retains them in contracted relation, or, in other words, resists centrifugal movements of the sections when the sleeve is rotating. A band 24 loosely encircles the ring sections between the spring 23, and the nose portions of the sections, being disposed, in the present instance, partly within an annular recess or cutaway portion 25, provided in the nose portions of the sections. This band is intended to limit the centrifugal movements of the sections. The outer cylindrical surface 21 of the short circuiting ring 17 substantially registers longitudinally with the inner cylindrical surface formed by the inner ends of the commutator segments 6 and auxiliary contact segments 12, so that an inward movement of the sleeve 13 by the speed responsive device forces the nose portion of the short circuiting ring 17, within the commutator in short circuiting contact with both sets of segments 6 and 12 thereof. While the centrifugal action of the ring sections 17ª will tend to hold them in short circuiting contact with the segments 6 and 12, it is desirable to effect a positive contact of the ring sections with said segments, and this is effected by coaction of the tapered portion 20 of the ring nose with an annular tapered surface 26 provided on a conductor ring 27 within the annular space between the sleeve 13 and segments 6 and 12 of the commutator construction. The free end of the short-circuiting ring nose is preferably rounded so that if, from centrifugal action, the outer cylindrical surface 21 of the ring is expanded to a greater extent than the size of the recess within the commutator, the rounded nose would first engage the adjacent edges of the commutator segments and effect a sufficient compression of the ring sections to permit the ring to move within the commutator recess when the sleeve 13 is drawn inward to short circuiting position.

The conductor ring 27 is threaded to, or otherwise suitably carried by, a hub extension on the end member 16 of the armature, and in addition to serving as an incline for forcing the ring sections into positive contact with the segments 6 and 12 of the commutator construction, also serves to electrically connect the several ring sections should a space occur therebetween. The conductor ring 27 also serves to carry the commutator construction, which, in the present instance, comprises a collar 28 fixed on the outer side of said ring and outwardly flanged at its outer end, with respect to the armature, to adapt it to be bolted, riveted or othewise secured to a collar 29 of insulating material which extends radially from the conductor ring 27 and is provided at its outer side with the contact segments 12 and without these, with the commutator segments 6. The segments 6 are secured to the collar 29 by screws 30, one of which passes through each segment 12. The screws 30 are insulated from the segments 12, and an insulator 31 is provided between each set of segments 6 and 12. It will also be understood that the segments of each set are insulated from each other.

The brush holders 7 are mounted on a ring 32, fastened to the left bearing housing 33, and each holder constitutes a box or guide in which is slidably mounted a brush 36, which has movement parallel with the axis of the motor at right angles to the face of the commutator. These brushes are adapted to bear on the commutator bars or segments when the motor starts whereby the high resistance winding will be commuted, and when the motor has attained speed the brushes are automatically withdrawn out of engagement with the commutator. Each brush is normally forced into engagement with the commutator by a lever 37, which is fulcrumed on a pivot pin 38, journaled in bearing lugs 39 on the brush housing or box at its outer edge, one arm of said lever being projected into position to bear inward against the outer end of the brush and the other arm of said lever being projected horizontally in position to receive the outward thrust of a spring finger 40 fixed at one end to the brush housing or box. A plate 41 projects outwardly from the rear end of each brush 36, and has a recess in its outer side into which engages a lug 43, projecting transversely from the outer end of a lever 44, which is carried by one end of the pivot pin 38.

It is preferable to have the lug 43 disposed at the outer side of the lever 37 so that a swinging of said lever by hand to inoperative position will cause the lever 44 to swing therewith, thereby effecting a withdrawal of the brush from engagement with the commutator, the extent of such withdrawal depending on the depth of the recess with which the lever 44 engages, for it will be understood that the deeper said recess, the greater will be the arc of movement of the lever 44 before its lug 43 has swung out of engagement therewith.

On each brush housing is fulcrumed at 45 an elbow lever 46, which is provided at the extremity of its fore-arm part with a lug 47 that is adapted to engage the lever 44, and force it outwardly to withdraw the brush from the commutator when the lever 46 is rocked in one direction. The lever 46 at its elbow portion carries a roller 48, which normally projects inward through a registering opening in the ring 32 into position to be engaged by an axially movable ring or collar 49 surrounding the shaft 4 and operatively connected with the speed responsive device, whereby a movement of such device, when the motor has attained its normal running speed, will cause the ring 49 to act on the rollers 48 to effect an outward throwing of the levers 46 and a consequent withdrawal of the brushes 36 from contact with the commutator. The ring 49, in the present instance, is provided with an internal annular recess which loosely receives a flange 50 on the outer end of the sleeve 13, whereby the ring is caused to have axial movements with said sleeve. The flange 50 is insulated from the walls of the ring recess. When the motor stops the ring 49 returns to its normal position, shown in Fig. 2, and the brushes reengage the commutator under the action of the springs 40 and levers 37. The brushes 36 in the present embodiment of the invention are disposed in a locally closed circuit 51, as shown diagrammatically in Fig. 7.

The speed responsive device 8, comprises a pair of swinging weights 52, arranged within a cylindrical hub extension 53 on the rear end of the armature. These weights have their pivots 54 on opposite sides of the armature shaft to adapt the weights to swing in a plane, transverse to the latter, outward and inward from the position shown in Fig. 3. Each weight acts on one arm of a bell-crank lever 55, the other arm of which is connected by a link 56, to the adjacent end of the sleeve or barrel 13, whereby an outward swinging of the weights imparts an inward movement to the sleeve 13 to move the short-circuiting ring 17 into operative short-circuiting connection with the contact bars 6 and 12.

An important feature of my present speed responsive device, which has not, so far as I am aware, been heretofore used in a similar connection, is to cause the outward movements of the weights to be limited by the stopping of the movements of the bell-crank levers 55 when the short-circuiting ring has been drawn into wedge contact with the segments 6 and 12 and the conductor ring 27, rather than having the weights swing outward to a predetermined point and then stop. By my arrangement the weights when in active position exert a continual automatically adjustable pressure on the levers 55 so that the short-circuiting ring may be drawn inward a greater or less extent depending on the depth of the recess within the commutator for receiving the same, thus compensating for any wear which may occur between the coacting parts of the short-circuiting means, or between the joints of the short-circuiting device, and insuring a perfect and positive contact at all times between the short-circuiting ring and the bars or segments 6 and 12. In Fig. 4, the weights are shown swung outward into the position which they assume when the parts are short-circuited, and the space between said weights and the flange of the hub extension 53, shows that the weights may be swung outward a considerable extent from their operative positions before being stopped by engagement with the hub extension.

It is evident from the foregoing that a single short-circuiting device is utilized to short-circuit both the segments of the commutator and the segments of the auxiliary set of contacts 12. It will be understood, however, that while such arrangement is preferable, on account of simplicity and cheapness of construction, it is not necessary, as separate means for short-circuiting the bars of the commutator and the bars of the auxiliary set of contacts may be provided. The essential feature of the invention resides in utilizing either a single or a plurality of windings of high resistance for obtaining a high torque at starting, and providing means for reducing such resistance by changing the character of the connections of the coils in the winding or windings from series to parallel whereby the resistance is cut down and the motor then adapted to run efficiently on the induction principle.

I wish it understood that the particular motor and the different parts thereof illustrated and described are merely a typical embodiment of one form of my invention, and that the specific form embodied herein is merely by way of illustrating and not by way of limitation or narrowing of the claims beyond what the state of the art may be required, as obviously a great many changes in construction and design can be made without departing from the invention.

Having thus described my invention, what I claim as new and desire to secure by Letters Patent, is,—

1. In an electric motor, a commutator, a high resistance armature winding having its coils connected at their ends to the commutator segments, a set of contact members adjacent to the commutator segments being insulated therefrom and from each other, leads extending from the coils intermediate their ends and connected to respective contact members, and means operable to short-circuit both the commutator segments and the contact members to reduce the resistance of the winding.

2. In an electric motor, a commutator, a high resistance armature winding having its coils connected at their ends to the commutator segments, a set of contact members adjacent to the commutator segments, being insulated therefrom and from each other, leads extending from the coils intermediate their ends and connected to respective contact members, a ring-like short-circuiting means operable to make contact with both the commutator segments and contact members to short-circuit the same to reduce the resistance of the winding.

3. In an electric motor, a commutator, a high resistance armature winding having its coils connected at their ends to the commutator segments, a set of contact members adjacent to the commutator segments, being insulated therefrom and from each other, leads extending from the coils intermediate their ends and connected to respective contact members, means forming an inclined surface adjacent to the commutator segments and contact member, and means movable into engagement with the inclined surface and caused thereby to have short-circuiting contact with the contact members.

4. In a motor of the class described, a commutator, an armature winding having its coils connected to the commutator segments, a short-circuiting device having a short-circuiting ring movable axially of the commutator in short-circuiting contact with the commutator segments, and a member having an inclined surface coacting with said ring to force it radially outward into firm contact with the commutator segments when the ring is moved axially into short-circuiting position.

5. In a motor of the class described, a commutator, an armature winding having its coils connected to the commutator segments, a short-circuiting device having an expansible short-circuiting ring movable axially of the commutator into short-circuiting contact with its segments, the ring having a plurality of loosely mounted segments, a member having an incline coacting with said ring to radially expand it into firm contact with the commutator segments when the ring is moved axially to short-circuiting position.

6. In a motor of the class described, a commutator, an armature winding having its coils connected to the commutator segments, an expansible short-circuiting ring movable axially of the commutator into and out of short-circuiting connection with its segments, a wedge member for coacting with said ring to positively expand it into firm contact with the commutator segments when moved to short-circuiting position, and means operable at speed to exert a continual pressure on said ring to urge it into automatically adjustable stop contact with said wedge member.

7. In a motor of the class described, a commutator, a high resistance armature winding having its coils connected with the commutator segments, a plurality of auxiliary leads from each coil of the winding intermediate its ends, and means operable to short-circuit said leads to reduce the resistance in the winding.

8. In a motor of the class described, a commutator, a high resistance armature winding having its coils connected to the commutator segments, a plurality of auxiliary leads from each coil of the winding, and means operable to short-circuit both the commutator segments and said leads to reduce the resistance in the winding.

9. In a motor of the class described, a commutator, a set of contacts, a high resistance armature winding having its coils connected to the commutator segments, means having an expansible short-circuiting member movable axially of the commutator into short-circuiting contact with both the commutator segments and said set of contacts, and means operable to expand said member into firm contact with both the commutator segments and said set of contacts when said member is moved to short-circuiting position.

10. In a motor of the class described, a commutator, a set of auxiliary contacts, a high resistance armature winding having its coils connected to the commutator segments and having connection with said contacts, an expansible short-circuiting ring movable axially of the commutator into and out of short-circuiting connection with its segments and with said contacts, a wedge member for coacting with said ring to positively expand it into firm contact with said segments and contacts when moved to short-circuiting position, and means operable to exert a continual pressure on said ring to force it into automatically adjustable stop contact with said wedge member.

11. In a motor of the class described, an armature, a commutator carried by said armature and open at its center, a set of auxiliary contacts carried by said armature and exposed to the center opening of the commutator together with the commutator segments, an incline disposed within said commutator opening, a short-circuiting ring, and means operable at speed to move said ring into the commutator opening in coaction with said incline to cause the ring to have positive short-circuiting contact with both the commutator segments and said auxiliary contacts.

In testimony whereof, I have hereunto signed my name to this specification.

HARRY W. JEANNIN.